(12) United States Patent
Cao et al.

(10) Patent No.: US 12,071,986 B2
(45) Date of Patent: Aug. 27, 2024

(54) MONOSTABLE ELECTROMAGNETIC CLUTCH

(71) Applicant: Jing-Jin Electric Technologies Co., Ltd., Beijing (CN)

(72) Inventors: Yang Cao, Beijing (CN); Ping Yu, Beijing (CN); Jianwen Li, Beijing (CN); Guoshan Liu, Beijing (CN); Pengyuan Zhou, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/193,305

(22) Filed: Mar. 30, 2023

(65) Prior Publication Data

US 2024/0026939 A1    Jan. 25, 2024

(30) Foreign Application Priority Data

Jul. 19, 2022  (CN) .......................... 202210849448.5

(51) Int. Cl.
*F16D 27/14*   (2006.01)
*F16D 27/00*   (2006.01)

(52) U.S. Cl.
CPC ........ *F16D 27/14* (2013.01); *F16D 2027/001* (2013.01)

(58) Field of Classification Search
CPC ........ F16D 27/09; F16D 27/14; F16D 27/118; F16D 2027/001
See application file for complete search history.

(56) References Cited

U.S. PATENT DOCUMENTS 4,185,722 A * 1/1980 Palmer .................. F16D 27/118
                                                  188/68
10,208,811 B2 * 2/2019 Greene .................... F16D 27/14
(Continued)

FOREIGN PATENT DOCUMENTS

CN     113090732 A     7/2021
CN     113494583 A     10/2021
(Continued)

OTHER PUBLICATIONS

European Search Report in EP23157484.9, mailed Dec. 15, 2023, 4 pages.

*Primary Examiner* — Huan Le
(74) *Attorney, Agent, or Firm* — ARENTFOX SCHIFF LLP

(57) ABSTRACT

A monostable electromagnetic clutch is disclosed, which comprises a movable member, a magnetic assembly, a fixed disc, and a plurality of iron cores, wherein the magnetic assembly is connected to the fixed disc, the iron cores cross through the magnetic assembly and are connected to the fixed disc, the movable member is provided thereon with an spring member, and under an action of an electromagnetic force of the magnetic assembly and an spring force of the spring member, the movable member can reciprocate at a side of the magnetic assembly to keep the movable member and the iron cores in an engaged state or a disengaged state. The structural design of the present disclosure is flexible and compact, and can be combined in a different way according to different applications and different structural spaces. The electromagnetic clutch basic units can be used separately, or a plurality of electromagnetic clutch basic units can be combined freely, and after combination, they can be freely arranged in a variety of installation positions and spaces as required, and the use of space can be fully optimized.

15 Claims, 4 Drawing Sheets

(56) References Cited

U.S. PATENT DOCUMENTS

| | | | |
|---|---|---|---|
| 2008/0146353 A1* | 6/2008 | Boffelli | H02K 49/108 |
| | | | 464/29 |
| 2022/0349460 A1 | 11/2022 | Yu et al. | |
| 2023/0143681 A1 | 5/2023 | Cao et al. | |
| 2023/0313846 A1 | 10/2023 | Cao et al. | |
| 2023/0358282 A1 | 11/2023 | Yu et al. | |

FOREIGN PATENT DOCUMENTS

| | | |
|---|---|---|
| CN | 114110122 A | 3/2022 |
| CN | 114704562 A | 7/2022 |
| EP | 1191137 A2 | 3/2002 |
| WO | 2022057158 A1 | 3/2022 |

* cited by examiner

MONOSTABLE ELECTROMAGNETIC CLUTCH

CROSS-REFERENCE TO RELATED APPLICATION

This application claims priority to Chinese Patent Application No. 202210849448.5, filed on Jul. 19, 2022, the disclosure of which is hereby incorporated by reference in its entirety.

TECHNICAL FIELD

The present disclosure belongs to the technical field of clutches, and more specifically, relates to a monostable electromagnetic clutch.

BACKGROUND

There are many application scenarios requiring switching mechanism in the power system of new energy vehicles, such as gear shifting, splitting, locking, parking, etc. An electromagnetic clutch is a preferred choice to realize the function of switching mechanism. With the continuous development of the new energy vehicle industry, the performance requirements of the electromagnetic clutch are becoming higher. However, conventional electromagnetic clutches have many disadvantages such as complex overall structure, incompactness, large occupied space, fewer applicable scenarios, limited layout space and installation position, which affect the spatial configuration of various components in the power system of the new energy vehicle to a certain extent.

SUMMARY

In view of the above background, the present disclosure provides a monostable electromagnetic clutch to overcome the above problems or at least partially solve the above problems.

In order to achieve the above object, the present disclosure adopts the following technical solutions.

A monostable electromagnetic clutch, comprising a movable member, a magnetic assembly, a fixed disc, and a plurality of iron cores, wherein the magnetic assembly is connected to the fixed disc, the iron cores cross through the magnetic assembly and are connected to the fixed disc, the movable member is provided thereon with an spring member, and under an action of an electromagnetic force of the magnetic assembly and an spring force of the spring member, the movable member can reciprocate at a side of the magnetic assembly to keep the movable member and the iron cores in an engaged state or a disengaged state.

Preferably, a side of the movable member close to the magnetic assembly is provided with a plurality of counterbores, a shape of the counterbore matches a shape of an end face of the iron core, so that the end face of the iron core can be embedded in the counterbore, and the spring member is disposed on the other side of the movable member.

Preferably, the movable member is a movable disc, and the counterbores are disposed on a side of the movable disc close to the magnetic assembly.

Preferably, the spring member is a position-returning spring assembly, and the position-returning spring assembly may be a linear spring, a nonlinear spring, or a spring assembly composed of linear and nonlinear springs.

Preferably, the magnetic assembly comprises an electromagnetic coil wrapped around a periphery of the iron core and a coil bobbin, and the coil bobbin is used to fix the electromagnetic coil.

Preferably, a periphery of the iron core is further provided with a flange, and the electromagnetic coil and the coil bobbin are provided between the flange and the fixed disc.

Preferably, the iron core has a cylindrical shape, and the magnetic assembly is provided around the periphery of the iron core.

Preferably, the flange is provided around the periphery of the iron core, and the magnetic assembly is provided between the flange and the fixed disc.

Preferably, the iron core is connected to the fixed disc via a fixing pin.

Preferably, the monostable electromagnetic clutch comprises two magnetic assemblies, two iron cores, two fixing pins, one fixed disc and a plurality of spring members.

The advantages and beneficial effects of the present disclosure are as follows.

The present disclosure adopts a modular design, and the movable member, fixed disc, magnetic assembly, spring member, iron cores, etc. are integrated into an electromagnetic clutch basic unit. The structural design of the present disclosure is flexible and compact, and can be combined in a different way according to different applications and different structural spaces. The electromagnetic clutch basic units can be used separately, or a plurality of electromagnetic clutch basic units can be combined freely, and after combination, they can be freely arranged in a variety of installation positions and spaces as required. Regarding the distribution space, they can be distributed evenly, symmetrically or asymmetrically according to actual needs, and the use of space can be fully optimized.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
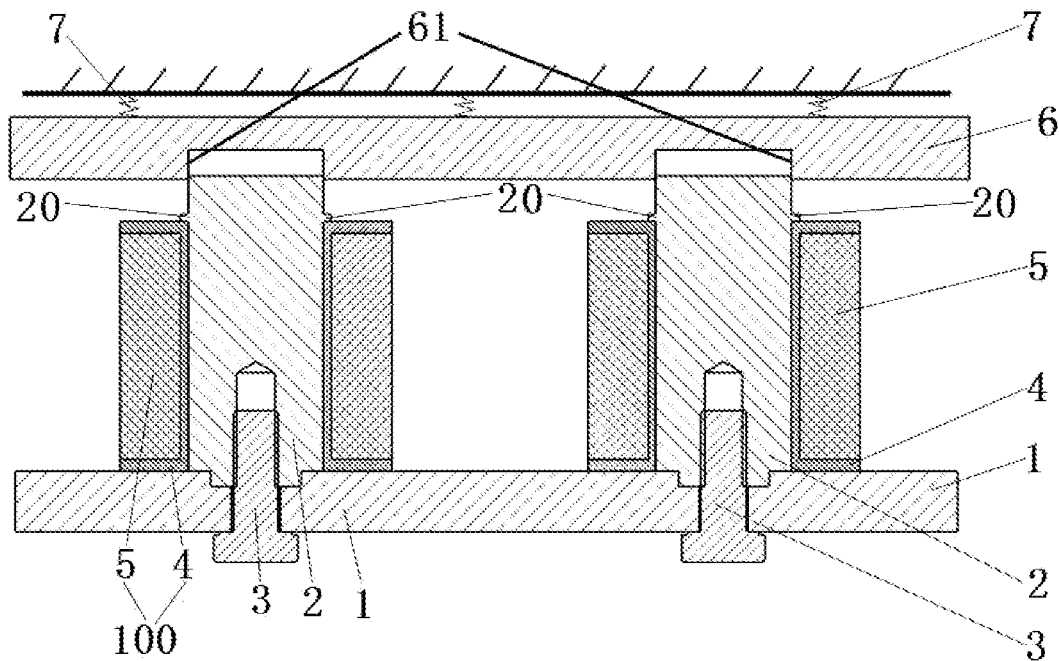
FIG. 1 is a cross-sectional view of a monostable electromagnetic clutch in a disengaged state according to the present disclosure.

In the drawings: 1. fixed disc; 2. iron core; 3. fixing pin; 4. coil bobbin; 5. electromagnetic coil; 6. movable member; 7. spring member; 8. bearing; 9. thrust disc; 10. anti-rotation pin; 11. anti-rotation pin; 12. end-toothed disc; 13. outer differential case; 14. inner differential case; 15. pressing ring; 16. half axle gear; 17. planetary gear shaft; 18. planetary gear; 19. half axle gear; 20. flange; 61. counterbore; 100. magnetic assembly.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described herein are only part of the embodiments of the present disclosure, rather than all of the embodiments. Based on these embodiments in the present disclosure, all other embodiments obtained by a person of ordinary skill in the art without paying creative work shall fall within the protection scope of the present disclosure.

Figure 2:
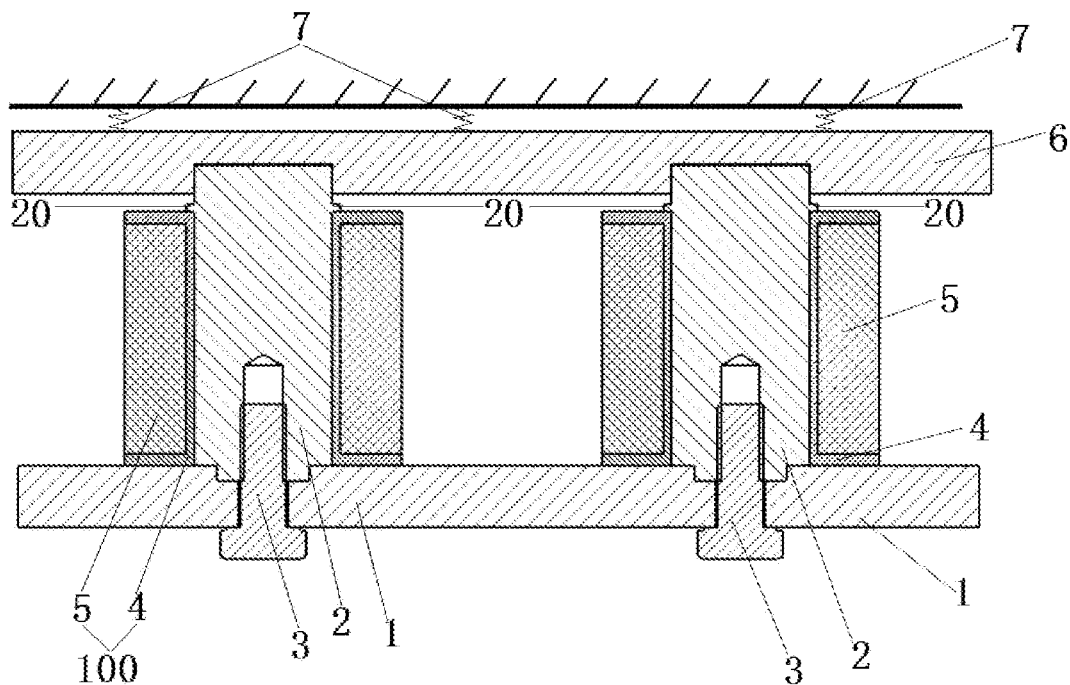
FIG. 2 is a cross-sectional view of a monostable electromagnetic clutch in an engaged state according to the present disclosure.

The technical solutions of embodiments of the present disclosure will be described in detail below in conjunction with the accompanying drawings. As shown in FIG. 1 and FIG. 2, the monostable electromagnetic clutch according to the present disclosure comprises: a movable member 6, a magnetic assembly 100, a fixed disc 1, and a plurality of iron cores 2. The magnetic assembly 100 is connected to the fixed disc 1, and the iron cores 2 cross through the magnetic assembly 100 and are connected to the fixed disc 1. The movable member 6 is provided thereon with an spring member 7. The magnetic assembly 100 can generate an electromagnetic force when it is energized. Under the action of the electromagnetic force of the magnetic assembly 100 and the spring force of the spring member 7, the movable member 6 can reciprocate at a side of the magnetic assembly 100 to keep the movable member 6 and the iron cores 2 in an engagement state or a disengagement state. When the magnetic assembly is energized, the movable member 6 is attracted to a position close to the iron cores 2 under the action of electromagnetic force (see FIG. 2) to realize the engagement of the electromagnetic clutch. When the magnetic assembly is not energized, the movable member 6 returns to its original position under the spring force of the spring member 7, as shown in FIG. 1. At this moment, the movable member 6 does not connect to the iron cores 2, and the electromagnetic clutch is disengaged.

In an embodiment of the present disclosure, as shown in FIG. 1, a plurality of counterbores 61 is provided at a side of the movable member 6 close to the magnetic assembly 100. The shape of the counterbores 61 matches the shape of an end face of the iron core 2, so that the end face of the iron core 2 can be embedded in the counterbores 61. When the end face of the iron cores is embedded in the counterbores, the electromagnetic clutch is in an engaged state, and when they are not embedded, the electromagnetic clutch is in a disengaged state. The working flow of this embodiment is as follows. When the magnetic assembly 100 is not energized, referring to FIG. 1, the movable member 6 is not embedded in the iron core, and the electromagnetic clutch is in a disengaged or disconnected state. When the magnetic assembly 100 is energized, referring to FIG. 2, the electromagnetic force generated at this moment attract the movable member 6 to a position close to the iron cores 2. At this moment, the spring member 7 at the other side of the movable member 6 is stretched, and the electromagnetic force is greater than the spring force to keep the electromagnetic clutch in an engaged state. Upon the magnetic assembly is de-energized, the electromagnetic force disappears, and the movable member 6 will return to the state of the electromagnetic clutch shown in FIG. 1 again, and the cycle repeats itself in this way. Preferably, in order to further improve the stability of connection, in an embodiment of the present disclosure, the iron core 2 is connected to the fixed disc 1 via a fixing pin 3.

In an embodiment of the present disclosure, the movable member 6 is designed to have a disc-shaped structure to save space. Namely, it is designed as a movable disc. The counterbores 61 are provided on a side of the movable disc close to the magnetic assembly 100 and correspond to the position of the end face of the iron cores 2, and the spring member 7 is provided at the other side of the movable disc.

In an embodiment of the present disclosure, the spring member 7 is preferably a position-returning spring assembly, which may be a linear spring, a non-linear spring, or a spring assembly composed of linear and non-linear springs.

In an embodiment of the present disclosure, the magnetic assembly 100 comprises an electromagnetic coil 5 wrapped around a periphery of the iron core and a coil bobbin 4, and the coil bobbin 4 is used to fix the electromagnetic coil 5.

In an embodiment of the present disclosure, the periphery of the iron core 2 is further provided with a flange 20. The electromagnetic coil 5 and the coil bobbin 4 are provided between the flange 20 and the fixed disc 1, and the magnetic assembly 100 is clamped by the flange 20 to prevent it from falling off. More preferably, the iron core 2 is designed to have a cylindrical shape, the magnetic assembly 100 is provided around the periphery of the iron core 2, and the flange 20 is provided around the periphery of the iron core 2. The surrounding flange 20 can better clamp the magnetic assembly 100 between the flange 20 and the fixed disc 1.

In a preferred embodiment of the present disclosure, a monostable electromagnetic clutch basic unit comprises two magnetic assemblies 100, two iron cores 2, two fixing pins 3, one fixed disc 1 and a plurality of spring members 7. In this embodiment, the electromagnetic clutch basic unit has fewer parts, is simple in structure and does not occupy much space. The electromagnetic clutch basic units can be applied separately, or a plurality of electromagnetic clutch basic units can be combined freely. Their application scenarios include but are not limited to the following scenarios.

Example 1

Figure 3:
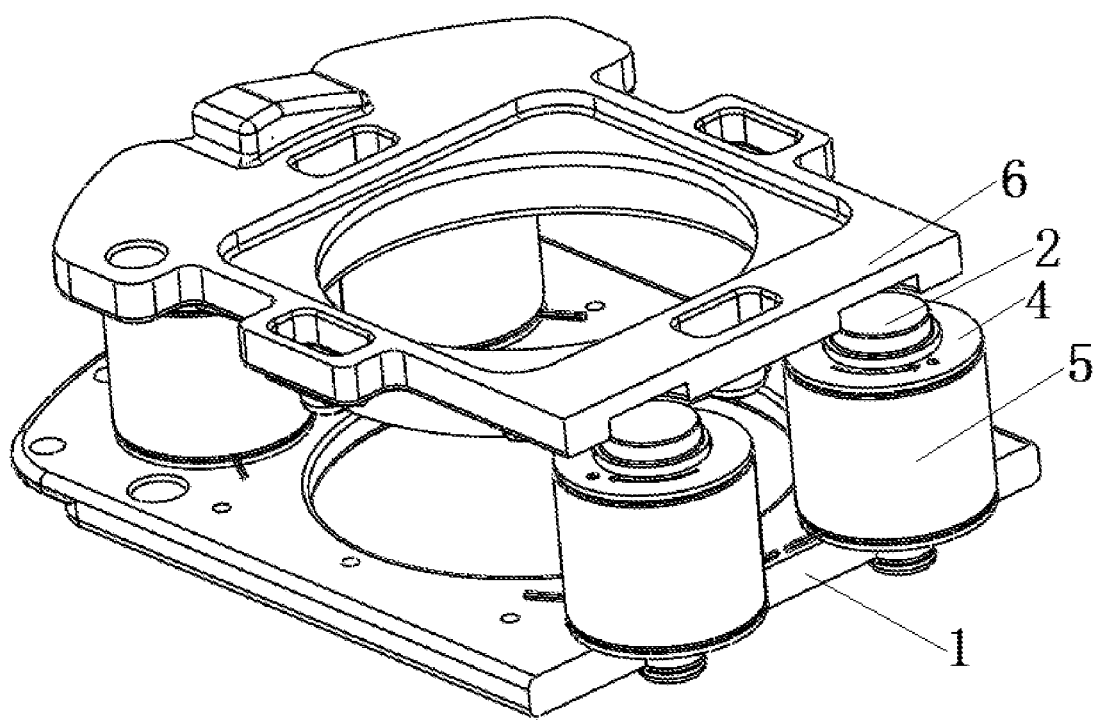
FIG. 3 is a combined application of a monostable electromagnetic clutch according to example 1 of the present disclosure.

Referring to FIG. 3, in this embodiment, two electromagnetic clutch basic units are symmetrically arranged to form a symmetrical electromagnetic clutch structure. The fixed disc 1 and the movable member 6 are integrated into one integral part. This embodiment can be applied to the situation where the circumferential space is limited to a certain extent and the axial space is smaller.

Example 2

Figure 4:
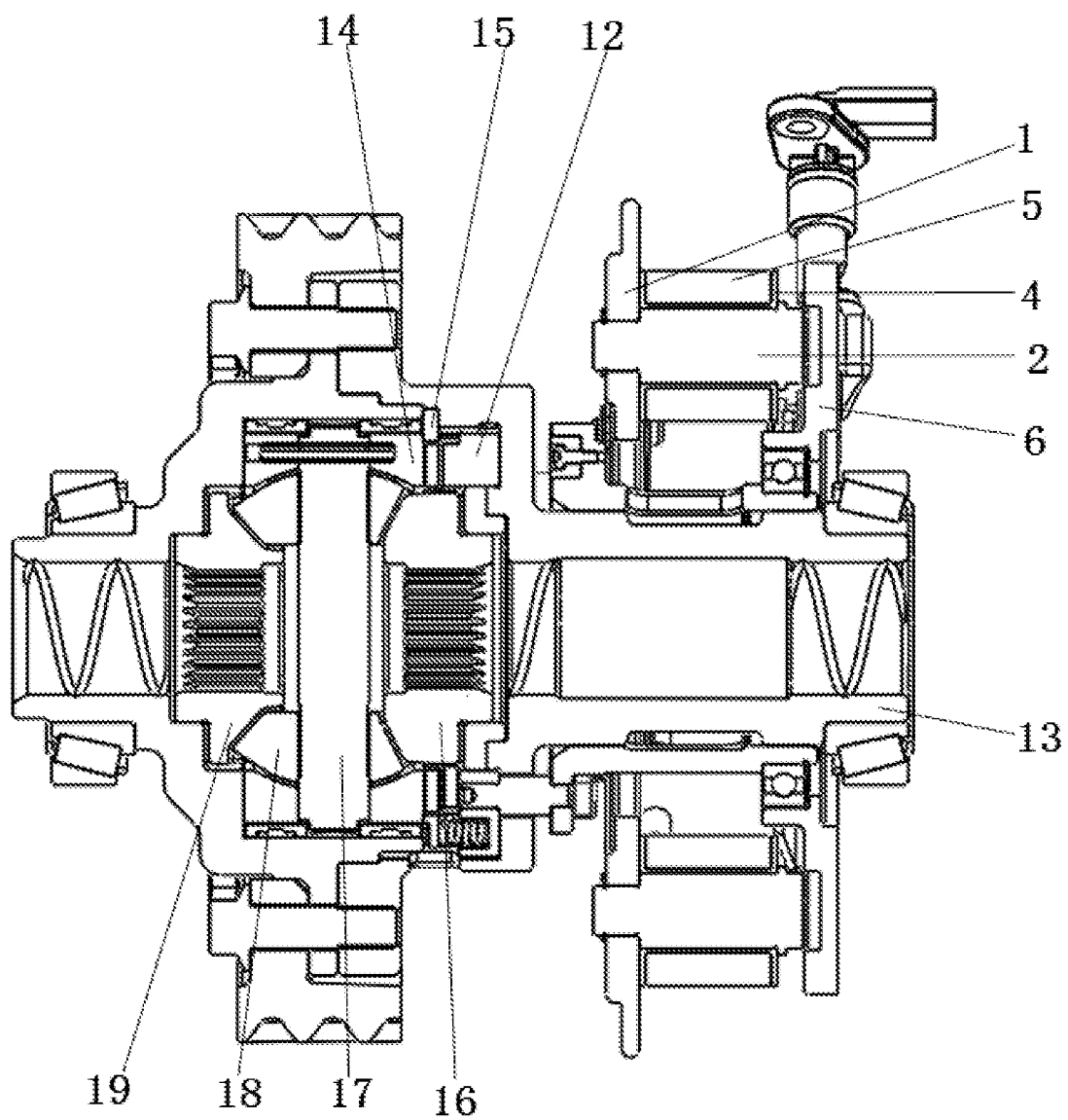
FIG. 4 and FIG. 5 are a combined application of a monostable electromagnetic clutch of example 2 of the present disclosure.
Figure 5:
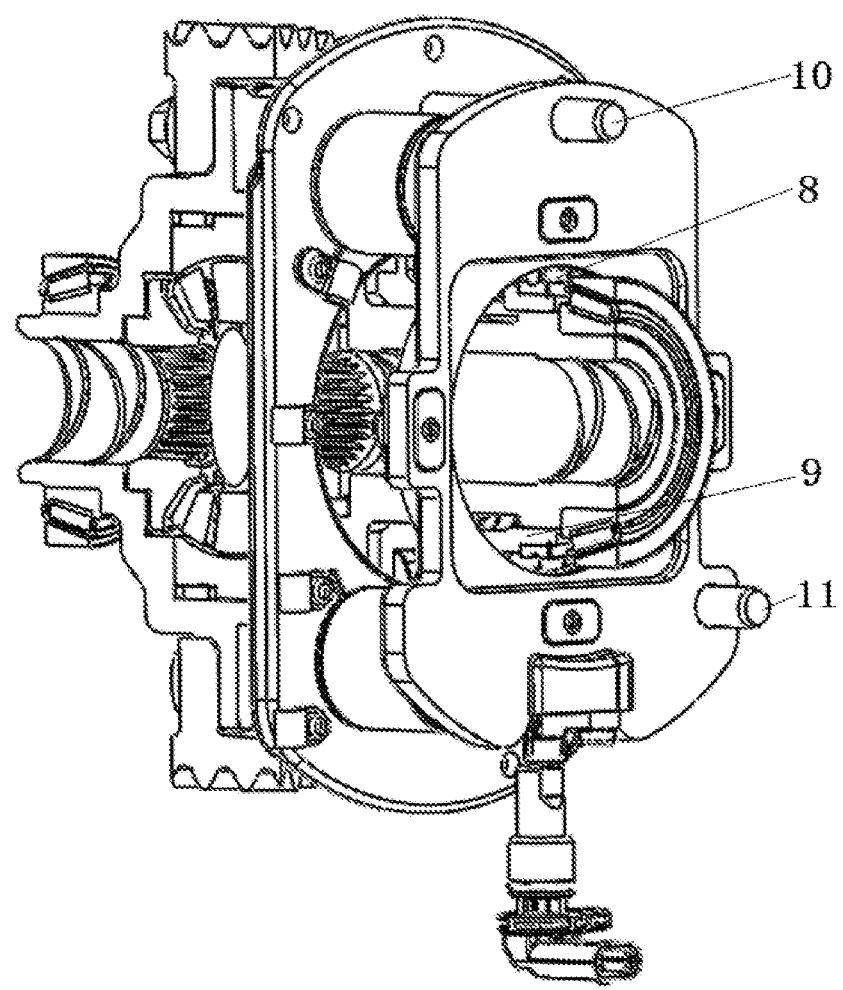

Referring to FIG. 4 and FIG. 5, in this embodiment, the example 1 is specifically applied to the disconnect function. In this embodiment, the electromagnetic clutch in example 1 is sleeved at a side of a differential. The movable member 6 is connected to an thrust disc 9 via a bearing 8, so that the movable assembly of the electromagnetic clutch body can only move linearly in the axial direction. At the same time, in order to limit the rotation and movement in other degrees of freedom of the movable assembly of the electromagnetic clutch body, in this embodiment, the movable member 6 is also provided thereon with an anti-rotation pin 10 and an anti-rotation pin 11, which are fixed and restrict the movable assembly to move only axially. The thrust disc 9 and an end-toothed disc 12 are connected by bolts, pins or flange on the thrust disc 9/the end-toothed disc 12. The connecting part crosses through the differential case. The outer edge of the end-toothed disc is provided with an external spline, the differential case is provided with corresponding an internal spline slot, and during the rotation of the differential, the end face gear is driven to transmit rotation speed and torque via the spline connection.

As shown in FIG. 4, an inner differential case 14 is provided thereon with end face teeth which can mesh with end face teeth on the end-toothed disc 12. A spring assembly is provided between the end-toothed disc 12 and a pressing ring 15. When the electromagnetic clutch is in a disengaged state, the spring assembly between the end-toothed disc 12 and the pressing ring 15 enables the end face teeth on the end-toothed disc 12 and the end face teeth on the inner differential case 14 in a disengaged state. At this moment, the inner differential case operates independently, and the outer differential case cannot transmit energy to a half axle gear 16 and a half axle gear 19.

When an excitation current is supplied to the electromagnetic coil 5, the electromagnetic clutch is engaged, and the movable member 6 moves toward the electromagnetic coil 5. The movable member 6 pushes the thrust disc 9 via the bearing 8, and the thrust disc 9 pushes the end-toothed disc 12 to move toward the inner differential case 14 via the connecting part until the end-toothed disc 12 connects to the end face teeth of the inner differential case 14. The movable assembly stops upon moving to a position-limiting device on an outer differential case 13 and the thrust disc 9. At this moment, the differential lock is in an engaged state. In the engaged state, there is no relative movement between the inner differential case 14 and the outer differential case 13. At this moment, the torque and rotation speed transmitted to the outer differential case are transmitted to the inner differential case 14 via the end-toothed disc 12, and the torque and rotation speed are further transmitted to the half axle gear 16 and the half axle gear 19 via a planetary gear 18 and a planetary gear shaft 17.

The above only describes the specific embodiments of the present disclosure. Under the above teaching of the present disclosure, a person skilled in the art can make other improvements or modifications on the basis of the above embodiments. A person skilled in the art should understand that the above specific description is only for better explaining the purpose of the present disclosure, and the protection scope of the present disclosure should be subject to the protection scope of the claims.

What is claimed is:

1. A monostable electromagnetic clutch comprising:
   a movable member provided with a spring member;
   a fixed disc;
   a magnetic assembly connected to the fixed disc; and
   a plurality of iron cores that cross through the magnetic assembly and are connected to the fixed disc,
   wherein, under an action of an electromagnetic force of the magnetic assembly and a spring force of the spring member, the movable member is configured to reciprocate at a side of the magnetic assembly to keep the movable member and the iron cores in an engaged state or a disengaged state;
   wherein a side of the movable member facing the magnetic assembly includes a plurality of counterbores having a shape that matches a shape of an end face of the plurality of iron cores, respectively, such that the end face of each iron core is configured to be embedded in the respective counterbore, and
   wherein the spring member is disposed on a side of the movable member opposite the side facing the magnetic assembly.

2. The monostable electromagnetic clutch according to claim 1, wherein the movable member is a movable disc, and the counterbores are disposed on a side of the movable disc close to the magnetic assembly.

3. The monostable electromagnetic clutch according to claim 2, wherein the iron core is connected to the fixed disc via a fixing pin.

4. The monostable electromagnetic clutch according to claim 1, wherein the spring member is a position-returning spring assembly, and the position-returning spring assembly is at least one of a linear spring, a nonlinear spring, or a spring assembly composed of linear and nonlinear springs.

5. The monostable electromagnetic clutch according to claim 4, wherein the iron core is connected to the fixed disc via a fixing pin.

6. The monostable electromagnetic clutch according to claim 1, wherein the magnetic assembly comprises an electromagnetic coil wrapped around a periphery of the iron core and a coil bobbin, and the coil bobbin is used to fix the electromagnetic coil.

7. The monostable electromagnetic clutch according to claim 6, wherein the iron core is connected to the fixed disc via a fixing pin.

8. The monostable electromagnetic clutch according to claim 6, wherein the periphery of the iron core is further provided with a flange, and the electromagnetic coil and the coil bobbin are provided between the flange and the fixed disc.

9. The monostable electromagnetic clutch according to claim 8, wherein the iron core is connected to the fixed disc via a fixing pin.

10. The monostable electromagnetic clutch according to claim 8, wherein the iron core has a cylindrical shape, and the magnetic assembly is provided around the periphery of the iron core.

11. The monostable electromagnetic clutch according to claim 10, wherein the iron core is connected to the fixed disc via a fixing pin.

12. The monostable electromagnetic clutch according to claim 10, wherein the flange is provided around the periphery of the iron core, and the magnetic assembly is provided between the flange and the fixed disc.

13. The monostable electromagnetic clutch according to claim 12, wherein the iron core is connected to the fixed disc via a fixing pin.

14. The monostable electromagnetic clutch according to claim 1, wherein the iron core is connected to the fixed disc via a fixing pin.

15. The monostable electromagnetic clutch according to claim 1, further comprising two magnetic assemblies, two iron cores, two fixing pins, one fixed disc and a plurality of spring members.

* * * * *